(12) United States Patent
Chandrasekar

(10) Patent No.: US 12,139,012 B2
(45) Date of Patent: Nov. 12, 2024

(54) SYSTEMS AND METHODS FOR WAREHOUSE ENVIRONMENT SPEED ZONE MANAGEMENT

(71) Applicant: Crown Equipment Corporation, New Bremen, OH (US)

(72) Inventor: Kashyap Chandrasekar, Auckland (NZ)

(73) Assignee: Crown Equipment Corporation, New Bremen, OH (US)

(*) Notice: Subject to any disclaimer, the term of this patent is extended or adjusted under 35 U.S.C. 154(b) by 0 days.

(21) Appl. No.: 18/493,199

(22) Filed: Oct. 24, 2023

(65) Prior Publication Data

US 2024/0059145 A1 Feb. 22, 2024

Related U.S. Application Data

(63) Continuation of application No. 17/695,159, filed on Mar. 15, 2022, now Pat. No. 11,820,224, which is a
(Continued)

(51) Int. Cl.
*B60K 31/00* (2006.01)
*B60Q 9/00* (2006.01)
*G05D 1/00* (2006.01)

(52) U.S. Cl.
CPC ........ *B60K 31/0058* (2013.01); *B60Q 9/00* (2013.01); *G05D 1/021* (2013.01); *B60K 2031/0091* (2013.01)

(58) Field of Classification Search
CPC ........ B60K 31/0058; B60K 2031/0091; B60Q 9/00; G05D 1/021
See application file for complete search history.

(56) References Cited

U.S. PATENT DOCUMENTS

| 8,515,629 B2 | 8/2013 | Medwin et al. |
| 8,630,795 B2 * | 1/2014 | Breed ............ G01C 21/3697 701/1 |

(Continued)

FOREIGN PATENT DOCUMENTS

| CN | 103926929 A | 7/2014 |
| CN | 105518749 A | 4/2016 |

(Continued)

OTHER PUBLICATIONS

Australian Office Action dated Feb. 28, 2024, pertaining to AU Patent Application No. 2019312584, 3 pgs.
(Continued)

*Primary Examiner* — Gertrude Arthur Jeanglaude
(74) *Attorney, Agent, or Firm* — Dinsmore & Shohl LLP

(57) ABSTRACT

A materials handling vehicle comprises a processor, a throttle, and a zone sensing subsystem coupled to the processor. The processor, responsive to the zone sensing subsystem detecting that the materials handling vehicle is in a restricted operational zone, controls the materials handling vehicle by applying a maximum vehicle operational limit of the materials handling vehicle to a magnitude that is at or below an operational limit of the restricted operational zone. Further, the processor overrides the maximum vehicle operational limit based on application of a throttle neutral action.

17 Claims, 4 Drawing Sheets

Related U.S. Application Data continuation of application No. 16/527,857, filed on Jul. 31, 2019, now Pat. No. 11,305,650.

(60) Provisional application No. 62/713,224, filed on Aug. 1, 2018.

(56) References Cited

U.S. PATENT DOCUMENTS

| | | |
|---|---|---|
| 9,174,830 B1 | 11/2015 | Bell |
| 9,340,399 B2 | 5/2016 | Bell |
| 9,349,181 B2 | 5/2016 | Chandrasekar et al. |
| 9,541,922 B2 | 1/2017 | Tsujimoto et al. |
| 9,679,425 B2 | 6/2017 | Elbling et al. |
| 9,811,088 B2 | 11/2017 | Walton et al. |
| 9,828,092 B1 | 11/2017 | Navot et al. |
| 9,958,873 B2 | 5/2018 | Thomson |
| 9,984,467 B2 | 5/2018 | Chandrasekar et al. |
| 11,305,650 B2 | 4/2022 | Chandrasekar |
| 2009/0079555 A1 | 3/2009 | Aguirre et al. |
| 2012/0245756 A1* | 9/2012 | Cooprider ............ B60W 50/14 701/1 |
| 2014/0277691 A1 | 9/2014 | Jacobus et al. |
| 2016/0052762 A1* | 2/2016 | Swift .................... B66F 9/0755 340/425.5 |
| 2016/0185291 A1 | 6/2016 | Chamberlin |
| 2018/0143638 A1 | 5/2018 | Walton et al. |
| 2019/0265722 A1 | 8/2019 | Haeusler et al. |

FOREIGN PATENT DOCUMENTS

| | | |
|---|---|---|
| CN | 106573766 A | 4/2017 |
| CN | 106740417 A | 5/2017 |
| GB | 2383310 A | 6/2003 |
| GB | 2534030 A | 7/2016 |
| KR | 20090005148 U | 5/2009 |
| WO | WO2009129295 A2 | 10/2009 |
| WO | 2012115920 A1 | 8/2012 |
| WO | 2016028758 A1 | 2/2016 |
| WO | WO2016179532 A1 | 11/2016 |

OTHER PUBLICATIONS

International Search Report and Written Opinion relating to International Application No. PCT/US2019/044398 mailed Nov. 21, 2019.
"Automatic Speed Restriction", http://www.forktruckcontrol.com/forklift-safety/speed-zoning; Published/accessed: Jul. 10, 2018.
"Low Speed Area (LSA)", https://www.claitec.com/en/portfolio/low-speed-area-lsa; Published/accessed: Jul. 10, 2018.
"Automatic R-gage radar system", https://www.forkway.co.uk/fleetsafe/speedzone; Published/Accessed: Jul. 10, 2018.
"Sensor technology offers integrated stability control to eliminate tip overs", https://www.foodlogistics.com/warehousing/article/12041480/want-a-safer-warehouse-start-withforklift-users; Published/Accessed: Jul. 10, 2018.
Martinez et al; Autonomous navigation of an automated guided vehicle in industrial environments (2009) Elsevier Robotics and Computer-Integrated Manufacturing 26 (2010) 296-311 (Year: 2009).
Mexican Office Action dated Jun. 26, 2024, pertaining to MX Patent Application No. MX/a/2021/000678, 9 pgs.
Korean Notice of Preliminary Rejection dated Jun. 2, 2024, pertaining to KR Patent Application No. 10-2021-7001125, 6 pgs.

* cited by examiner

SYSTEMS AND METHODS FOR WAREHOUSE ENVIRONMENT SPEED ZONE MANAGEMENT

CROSS-REFERENCE TO RELATED APPLICATIONS

This application is a continuation of U.S. patent application Ser. No. 17/695,159, filed Mar. 15, 2022, now U.S. Pat. No. 11,820,224, which is a continuation of U.S. patent application Ser. No. 16/527,857, filed Jul. 31, 2019, now U.S. Pat. No. 11,305,650, which claims the benefit of U.S. Provisional Application No. 62/713,224, entitled "SYSTEMS AND METHODS FOR INDUSTRIAL ENVIRONMENT SPEED ZONE MANAGEMENT," filed Aug. 1, 2018, the entirety of which is incorporated by reference herein.

TECHNICAL FIELD

The present specification generally relates to systems and methods for using the location of industrial vehicles to assist with managing vehicle operation within a defined area in a warehouse environment and, more specifically, to systems and methods for utilization of a vehicle location to notify an operator of operational constraints on entering a zone and, when the operator changes the operation of the vehicle within defined operational constraints, limiting the vehicle operation to remain within those operational constraints.

BACKGROUND

In order to move items about an industrial environment, workers often utilize industrial vehicles, including for example, forklift trucks, hand and motor driven pallet trucks, and/or other materials handling vehicles. The industrial vehicles can be configured as an automated guided vehicle that navigates through the industrial environment or a manually guided vehicle that knows its location within the industrial environment. In order to facilitate automated guidance, navigation, or both, the industrial vehicle may be adapted for localization within the environment. That is the industrial vehicle can be adapted with sensors and processors for determining the location of the industrial vehicle within the environment such as, for example, pose and position of the industrial vehicle.

SUMMARY

According to the subject matter of the present disclosure, a materials handling vehicle configured to navigate along an inventory transit surface in a warehouse environment comprises a speed control processor, a speed zone sensing subsystem, a materials handling mechanism configured to engage goods in the warehouse environment, a drive mechanism configured to move the materials handling vehicle along the inventory transit surface, and vehicle control architecture in communication with the drive mechanism, the materials handling mechanism, the speed zone sensing subsystem, and the speed control processor. The speed zone sensing subsystem is configured to provide an indication of whether the materials handling vehicle is in a speed zone. The speed control processor is configured to prompt a vehicle operator to reduce a vehicle speed of the materials handling vehicle to under a speed zone limit when the materials handling vehicle speed is approaching or in the speed zone, determine whether the vehicle speed is under the speed zone limit in the speed zone, and apply a vehicle speed cap to limit a maximum vehicle speed of the materials handling vehicle to a magnitude that is at or below the speed zone limit when the speed control processor has determined that the vehicle speed is under the speed zone limit in the speed zone.

In accordance with one embodiment of the present disclosure, a materials handling vehicle configured to navigate along an inventory transit surface in a warehouse environment comprises a speed control processor, a speed zone sensing subsystem comprising one or more truck-based sensors, a materials handling mechanism configured to engage goods in the warehouse environment, a drive mechanism configured to move the materials handling vehicle along the inventory transit surface, and vehicle control architecture in communication with the drive mechanism, the materials handling mechanism, the speed zone sensing subsystem, and the speed control processor. The speed zone sensing subsystem is configured to provide an indication of whether the materials handling vehicle is in a speed zone, and the one or more truck-based sensors are configured (i) to detect active or passive speed zone tags, (ii) for environmentally-based sensing of the speed zone, or (iii) both. The speed control processor is configured to prompt a vehicle operator to reduce a vehicle speed of the materials handling vehicle to under a speed zone limit when the materials handling vehicle speed is approaching or in the speed zone, determine whether the vehicle speed is under the speed zone limit in the speed zone, and apply a vehicle speed cap to limit a maximum vehicle speed of the materials handling vehicle to a magnitude that is at or below the speed zone limit when the speed control processor has determined that the vehicle speed is under the speed zone limit in the speed zone.

In accordance with another embodiment of the present disclosure, a materials handling vehicle configured to navigate along an inventory transit surface in a warehouse environment comprises an operation control processor, a restricted zone sensing subsystem, a materials handling mechanism configured to engage goods in the warehouse environment, a drive mechanism configured to move the materials handling vehicle along the inventory transit surface, and vehicle control architecture in communication with the drive mechanism, the materials handling mechanism, the restricted zone sensing subsystem, and the operation control processor. The restricted zone sensing subsystem is configured to provide an indication of whether the materials handling vehicle is in a restricted operation zone. The operation control processor is configured to prompt a vehicle operator to reduce an operation of the materials handling vehicle to under an operation limit when the materials handling vehicle speed is approaching or in the restricted operation zone, determine whether the operation is under the operation limit in the restricted operation zone, and apply an operation cap to limit a maximum operation value of the materials handling vehicle to a magnitude that is at or below the operation limit when the operation control processor has determined that the operation is under the operation limit in the restricted operation zone.

According to aspects of the present disclosure, a materials handling vehicle comprises a processor, a throttle, and a speed zone sensing coupled to the processor. Responsive to the speed zone sensing subsystem detecting that the materials handling vehicle is in a speed zone, the processor is configured to apply a maximum vehicle speed limit of the materials handling vehicle to a magnitude that is at or below a speed zone limit and overriding the maximum vehicle speed limit based on application of a throttle neutral action.

According to further aspects of the present disclosure, a materials handling vehicle comprises a processor, a throttle, and a zone sensing subsystem coupled to the processor. The processor, responsive to the zone sensing subsystem detecting that the materials handling vehicle is in a restricted operational zone, controls the materials handling vehicle by applying a maximum vehicle operational limit of the materials handling vehicle to a magnitude that is at or below an operational limit of the restricted operational zone. Further, the processor overrides the maximum vehicle operational limit based on application of a throttle neutral action.

These and additional features provided by the embodiments described herein will be more fully understood in view of the following detailed description, in conjunction with the drawings.

BRIEF DESCRIPTION OF THE SEVERAL VIEWS OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
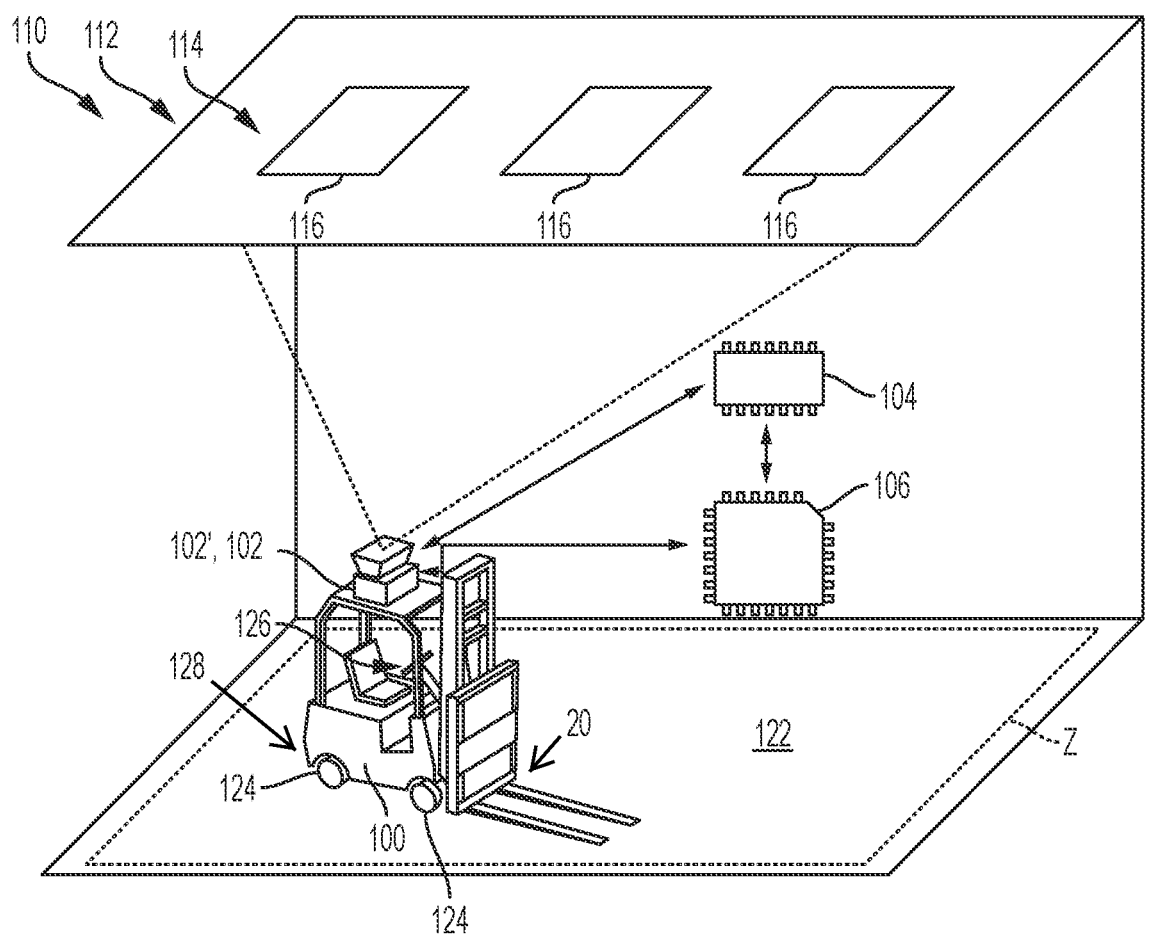
FIG. 1A depicts a materials handling vehicle in a speed zone of a warehouse, according to one or more embodiments shown and described herein.

The embodiments described herein generally relate to use of localization techniques to determine and assist with managing vehicle presence in speed zones in a warehouse environment as described herein. Localization is utilized herein to refer to any of a variety of system configurations that enable active tracking of a vehicle location in a warehouse, industrial or commercial facility, or other environment. For the purposes of defining and describing the concepts and scope of the present disclosure, it is noted that a "warehouse" encompasses any indoor or outdoor industrial facility in which materials handling vehicles transport goods including, but not limited to, indoor or outdoor industrial facilities that are intended primarily for the storage of goods, such as those where multi-level racks are arranged in aisles, and manufacturing facilities where goods are transported about the facility by materials handling vehicles for use in one or more manufacturing processes. The concepts of the present disclosure are not limited to any particular localization system configuration and are deemed to be applicable to any of a variety of conventional and yet-to-be developed localization systems. Such localization systems may include those described in U.S. Pat. No. 9,349,181 issued on May 24, 2016, entitled LOST VEHICLE RECOVERY UTILIZING ASSOCIATED FEATURE PAIRS, and U.S. Pat. No. 9,984,467 issued May 29, 2018, entitled VEHICLE POSITIONING OR NAVIGATION UTILIZING ASSOCIATED FEATURE PAIRS.

The localization systems may be used to localize and/or navigate an industrial vehicle through a warehouse environment, such as a warehouse, stock yard, or the like. In some embodiments, a camera and/or laser based system can be mounted to an industrial vehicle (e.g., automated guided vehicle or a manually guided vehicle) that navigates through a warehouse and can assist with vehicle localization. The laser based system may include a laser scanner, a laser rangefinder, a 2D/3D mapping laser, a lidar, or combinations thereof.

Referring now to FIG. 1, a materials handling vehicle 100 can be configured to navigate along an inventory transit surface 122 through an industrial facility such as a warehouse 110 in a warehouse environment 150. The materials handling vehicle 100 can comprise a drive mechanism 128 configured to move the materials handling vehicle 100 along an inventory transit surface 122, a materials handling mechanism 20 configured to engage goods in the warehouse environment 150, and vehicle control architecture in communication with the drive and materials handling mechanisms. The materials handling vehicle 100 can also comprise a speed control processor 104 and a speed zone sensing subsystem 106, and the vehicle control architecture may be in communication with the drive mechanism 128, the materials handling mechanism 20, the speed zone sensing subsystem 106, and the speed control processor 104. The vehicle control architecture may be configured to track the navigation of the materials handling vehicle 100 along the inventory transit surface 122, navigate the materials handling vehicle 100 along the inventory transit surface 122 in at least a partially automated manner, or both, using a localized vehicle position of the materials handling vehicle 100. The materials handling vehicle 100 can comprise an industrial vehicle such as one for lifting and moving a payload such as, for example, a forklift truck, a reach truck, a turret truck, a walkie stacker truck, a tow tractor, a pallet truck, a high/low, a stacker-truck, trailer loader, a sideloader, a fork hoist, or the like. The industrial vehicle can be configured to automatically or manually navigate an inventory transit surface such as an inventory transit surface 122 of the warehouse 110 along a desired path. Accordingly, the materials handling vehicle 100 can be directed forwards and backwards by rotation of one or more wheels 124. Additionally, the materials handling vehicle 100 can be caused to change direction by steering the one or more wheels 124. Optionally, the vehicle can comprise operator controls 126 for controlling functions of the vehicle such as, but not limited to, the speed of the wheels 124, the orientation of the wheels 124, or the like. The operator controls 126 can comprise controls that are assigned to functions of the materials handling vehicle 100 such as, for example, switches, buttons, levers, handles, pedals, input/output device, or the like. It is noted that the term "navigate" as used herein means movement control or route planning of a vehicle from one place to another including, but not limited to, plotting a graphical path for a manual vehicle operation, providing a set of turn by turn instructions for manual operation, or providing an automated control guiding the vehicle along a travel path that may include such turn by turn instructions for automated operation.

The materials handling vehicle 100 can further comprise a localization sensor 102' that may be a camera 102 and/or laser based system that may include a laser scanner, a laser rangefinder, a 2D/3D mapping laser, a lidar, or combinations thereof. For example, the materials handling vehicle 100 can further comprise a camera 102 as the localization sensor 102' for capturing overhead images such as input images of overhead features. The camera 102 can be any device capable of capturing the visual appearance of an object and transforming the visual appearance into an image. In some embodiments, the materials handling vehicle 100 can be located within the warehouse 110 and be configured to capture overhead images of the ceiling 112 of the warehouse 110.

The ceiling 112 of the warehouse 110 can comprise overhead features such as, but not limited to, ceiling lights 114 for providing illumination from the ceiling 112 or generally from above a vehicle operating in the warehouse. The ceiling lights 114 can comprise substantially rectangular lights such as, for example, skylights 116, fluorescent lights, or the like; and may be mounted in or suspended from the ceiling or wall structures so as to provide illumination from above.

The embodiments described herein can comprise one or more vehicular processors such as processors 202 (FIG. 2) as described in greater detail below, which include a speed control processor 104 (FIG. 1A) communicatively coupled to the materials handling vehicle 100 along with the speed zone sensing subsystem 106. The speed zone sensing subsystem 106 is configured to provide an indication of whether the materials handling vehicle is in a speed zone Z. In embodiments, the speed zone sensing subsystem 106 is configured to provide an indication of whether the materials handling vehicle 100 is in the speed zone Z of a plurality of speed zones in a warehouse environment, each speed zone comprising a speed zone limit from a plurality of speed zone limits, and at least one speed zone limit is different from another speed zone limit of the plurality of speed zone limits. The one or more processors 202 can execute machine readable instructions to implement any of the methods or functions described herein automatically. Memory 217 (FIG. 2) for storing machine readable instructions can be communicatively coupled to the one or more processors 202, the materials handling vehicle 100, or any combination thereof. The one or more processors 202 can comprise a processor, an integrated circuit, a microchip, a computer, or any other computing device capable of executing machine readable instructions or that has been configured to execute functions in a manner analogous to machine readable instructions. The memory 217 can comprise RAM, ROM, a flash memory, a hard drive, or any non-transitory device capable of storing machine readable instructions.

The one or more processors 202 (such as the speed control processor 104, the speed zone sensing subsystem 106, and the controller for operator controls 126) and the memory 217 may be integral with the materials handling vehicle 100. Moreover, each of the one or more processors 202 and the memory 217 can be separated from the materials handling vehicle 100 and/or the camera 102. For example, a management server, server, or a mobile computing device can comprise the one or more processors 202, the memory 217, or both. It is noted that the one or more processors 202, the memory 217, and the camera 102 may be discrete components communicatively coupled with one another without departing from the scope of the present disclosure. Accordingly, in some embodiments, components of the one or more processors 202, components of the memory 217, and components of the camera 102 can be physically separated from one another. The phrase "communicatively coupled," as used herein, means that components are capable of exchanging data signals with one another such as, for example, electrical signals via conductive medium, electromagnetic signals via air, optical signals via optical waveguides, or the like.

Thus, embodiments of the present disclosure may comprise logic or an algorithm written in any programming language of any generation (e.g., 1GL, 2GL, 3GL, 4GL, or 5GL). The logic or an algorithm can be written as machine language that may be directly executed by the processor, or assembly language, object-oriented programming (OOP), scripting languages, microcode, etc., that may be compiled or assembled into machine readable instructions and stored on a machine readable medium. Alternatively or additionally, the logic or algorithm may be written in a hardware description language (HDL). Further, the logic or algorithm can be implemented via either a field-programmable gate array (FPGA) configuration or an application-specific integrated circuit (ASIC), or their equivalents.

As is noted above, the materials handling vehicle 100 can comprise or be communicatively coupled with the one or more processors 202. Accordingly, the one or more processors 202 can execute machine readable instructions to operate or replace the function of the operator controls 126. The machine readable instructions can be stored upon the memory 217. Accordingly, in some embodiments, the materials handling vehicle 100 can be navigated automatically by the one or more processors 202 executing the machine readable instructions. In some embodiments, the location of the vehicle can be monitored by the localization system as the materials handling vehicle 100 is navigated.

For example, the materials handling vehicle 100 can automatically navigate along the inventory transit surface 122 of the warehouse 110 along a desired path to a desired position based upon a localized position of the materials handling vehicle 100. In some embodiments, the materials handling vehicle 100 can determine the localized position of the materials handling vehicle 100 with respect to the warehouse 110. The determination of the localized position of the materials handling vehicle 100 can be performed by comparing image data to map data. The map data can be stored locally in the memory 217, which can be updated periodically, or map data provided by a server or the like. In embodiments, an industrial facility map comprises a plurality of speed zones Z of the warehouse 110. Given the localized position and the desired position, a travel path can be determined for the materials handling vehicle 100. Once the travel path is known, the materials handling vehicle 100 can travel along the travel path to navigate the inventory transit surface 122 of the warehouse 110 crossing one or more of the speed zones Z. Specifically, the one or more processors 202 can execute machine readable instructions to perform localization system functions and operate the materials handling vehicle 100. In one embodiment, the one or more processors 202 can adjust the steering of the wheels 124 and control the throttle to cause the materials handling vehicle 100 to navigate the inventory transit surface 122. In another embodiment, the operator may control steering of the wheels 124 and navigation of the materials handling vehicle 100 on the inventory transit surface 122 through use of the operator controls 126. The inventory transit surface 122 may include one or more speed zones Z, as will be described in greater detail below.

Figure 1B:
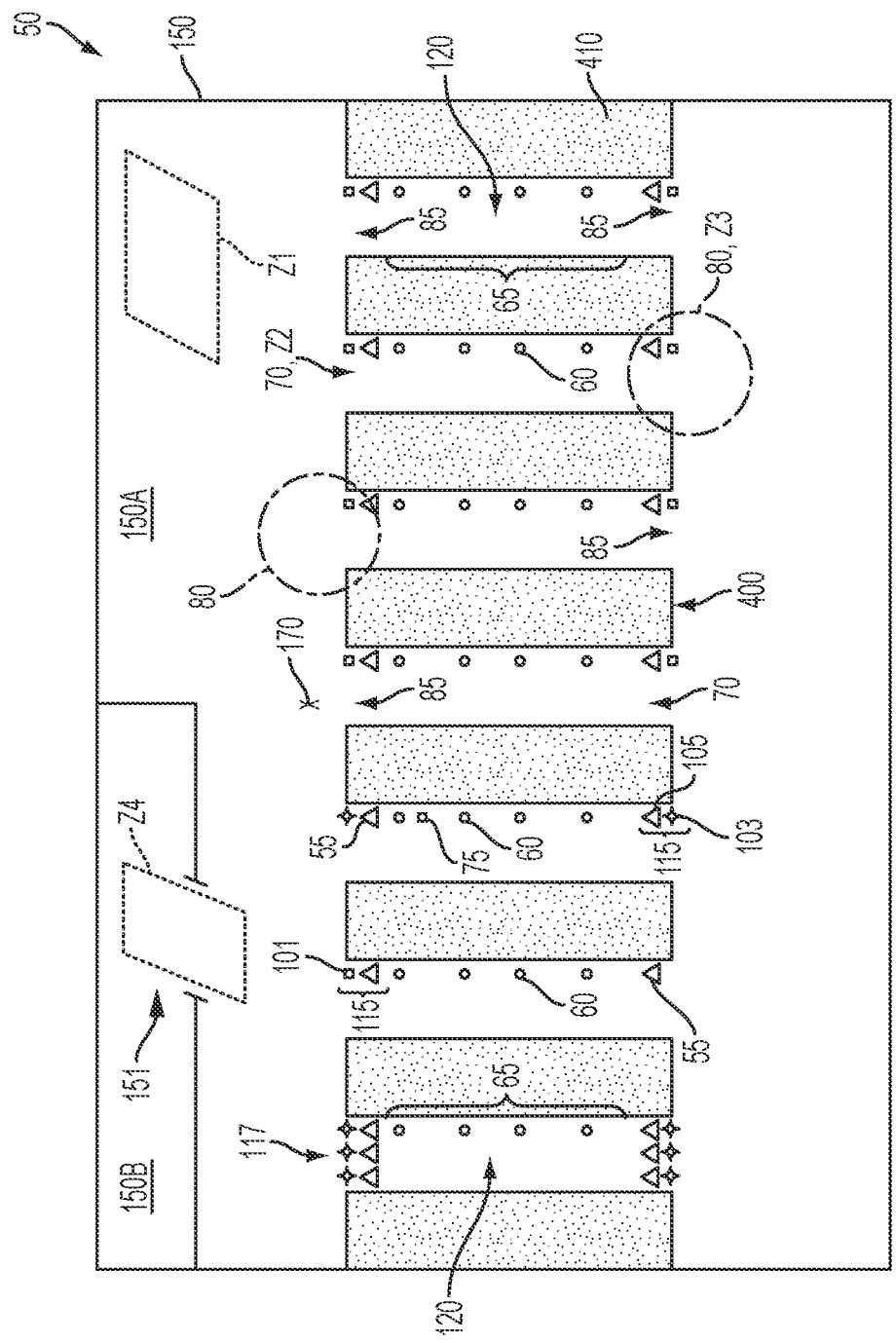
FIG. 1B depicts a schematic plan view of a warehouse environment utilizing tag reading technology and including one or more speed zones, according to one or more embodiments shown and described herein.

Referring to FIGS. 1A-1B, the materials handling vehicle 100 can be configured to navigate through a warehouse environment 150 (FIG. 1B) such as the warehouse 110. The industrial vehicle can be configured to automatically or manually navigate an inventory transit surface such as an inventory transit surface 122 of the warehouse 110 along a desired path.

The localization systems may be used to localize and/or navigate an industrial vehicle through a warehouse environment 150 (FIG. 1B), which may be a warehouse, stock yard, or the like. The warehouse 110 may include components 410 that may be, but are not limited to, a plurality of racks 400 including a plurality of shelves. In embodiments, the plurality of shelves may define a boundary of one or more aisle paths 70. The aisle or portions of the aisle may be defined by at least one rack 400 and an opposite defining component 410 such as, but not limited to, one or more pallet stacks, a mezzanine, a virtually defined aisle boundary, or the like.

Referring to FIG. 1B, the warehouse environment 150, which may be the warehouse 110 (FIG. 1A), may include a rack 400 and/or tag reading technology associated with path defining components 410 such as pallets and/or racks 400. The tag reading technology may include, for example, a tag layout 50 in a single aisle path 70, an example of which is described in U.S. Pat. No. 9,811,088 assigned to Crown Equipment Corporation. The tag layout 50 can be constructed to comprise individual tags, such as radio frequency identification (RFID) tags, that are positioned such that the materials handling vehicle 100 will operate under a defined set of vehicle functionality (e.g., vehicle function data) and/or tag-dependent position data that will endure until the materials handling vehicle 100 identifies another individual tag of the tag layout 50 with a new correlation of vehicle functionality.

In operation, the tag layout 50 may be utilized with respect to a tag reader and a reader module of the materials handling vehicle 100, examples of which are also described in U.S. Pat. No. 9,811,088 assigned to Crown Equipment Corporation and incorporated by reference herein in its entirety. The reader module may include a reader memory coupled to a reader processor. The tag reader and the reader module may cooperate to identify individual tags of a tag layout 50. Each individual tag of the tag layout 50 may correspond to a unique identification code associated with an individual tag at the beginning of the aisle path 70, for example. The individual tags comprise a plurality of zone identification tags 55 and a plurality of zone tags 60. Each zone identification tag 55 occupies a position in the tag layout 50 that corresponds to a unique set of zone tags 65 that each comprise a plurality of zone tags 60. In one embodiment, each unique set of zone tags 65 comprises a plurality of zone tags 60, one or more function tags 101, one or more aisle extension tags 170, one or more aisle entry tags 75, or combinations thereof. For example, and not by way of limitation, respective zone tags 60 of the unique set of zone tags 65 that are the furthest from a midpoint 120 of the aisle path 70 may comprise both vehicle functionality and end-of-aisle vehicle functionality.

Figure 3:
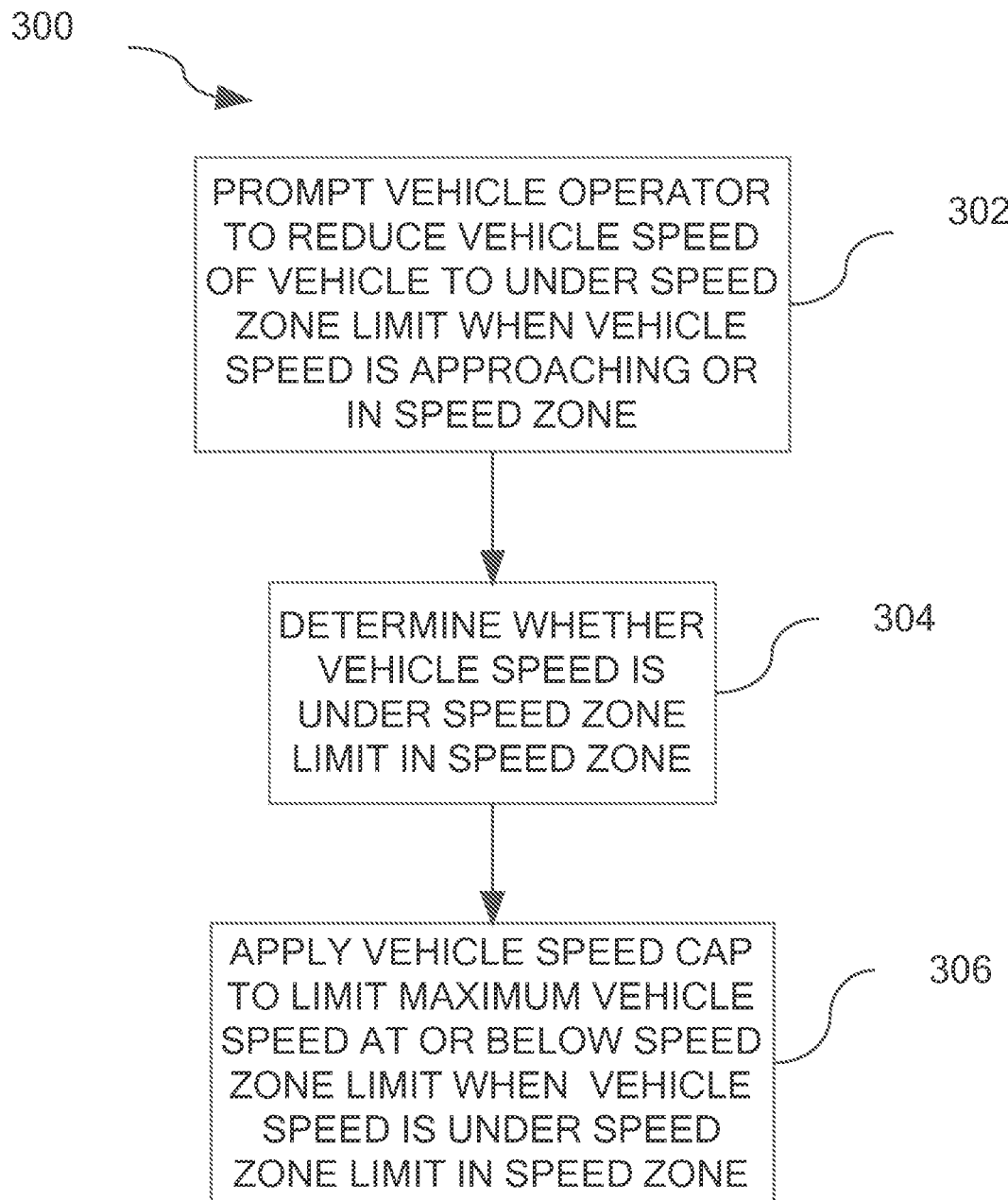
FIG. 3 depicts a flowchart overview of a method for speed zone management in a warehouse environment according to one or more embodiments shown and described herein.

The one or more speed zones Z or FIG. 1A may be, for example, one or more speed zones Z1, Z2, Z3, and Z4 of FIG. 1B. One or more aisle paths 70 may comprise an in-aisle speed zone Z2 and/or an end of aisle speed zone Z3, while the warehouse environment 150 may include one or more out-of-aisle speed zones Z1, Z4. The speed zone Z4 may be, for example, a speed zone disposed through a door area 151 separating a warehouse environment section 150A from another warehouse environment section 150B. The in-aisle speed zone Z2 may be speed zones as described in U.S. Pat. No. 9,811,088 assigned to Crown Equipment Corporation, as set forth above. As a non-limiting example, a display device of the materials handling vehicle 100 (FIG. 1A) may display "Speed Zone" and generate an audible tone or provide other alerts to indicate that the materials handling vehicle 100 is entering one or more speed zones Z at the current location of the materials handling vehicle 100 if a user is at the controls of the materials handling vehicle 100, as described in greater detail below with respect to a process 300 (FIG. 3).

As a non-limiting example, the individual tags of the tag layout 50 may comprise a plurality of aisle entry tags 75 that are positioned along an aisle path 70 between vehicle entry or vehicle exit portions 80 of the aisle path 70. The reader module on the materials handling vehicle 100 may discriminate between the aisle entry tags 75 and the individual tags of the tag layout 50 along the aisle path 70 and correlate end-of-aisle vehicle functionality with an identified aisle entry tag 75. A vehicle controller may control operational functions of the industrial vehicle hardware of the materials handling vehicle 100 in response to the correlation of end-of-aisle vehicle functionality with an identified aisle entry tag 75. In this manner, a tag layout 50 can be constructed to comprise aisle entry tags 75 that are positioned within an aisle path 70 such that particular end-of-aisle vehicle functionality can be implemented as an industrial vehicle 10, traveling within an aisle path 70, approaches the vehicle entry or vehicle exit portion 80 of the aisle path 70. An exit portion distance is a quantity of length measured between a current position of the materials handling vehicle 100 and the end point 85 of respective aisle paths 70.

The reader module may discriminate between an outer end-cap tag 103 and an inner end-cap tag 105 of the end-cap pair 115 and correlate an identified outer end-cap tag 103 with exit-specific vehicle functionality and correlate an identified inner end-cap tag 105 with entry-specific vehicle functionality. In one embodiment, the tag layout 50 may comprise one or more end-cap rows 117 which comprise a plurality of end-cap pairs 115. The one or more end-cap rows 117 are spaced across respective end points 85 of an aisle path 70 such that an industrial vehicle entering or exiting the aisle path 70 will identify the individual tags of the end-cap row 117 regardless of where the materials handling vehicle 100 crosses the end-cap row 117 within the vehicle entry or vehicle exit portion 80 of the aisle path 70. The rack 400 may be a multilevel rack in defining a portion of the aisle path 70 in a very narrow aisle (VNA) warehouse.

Figure 2:
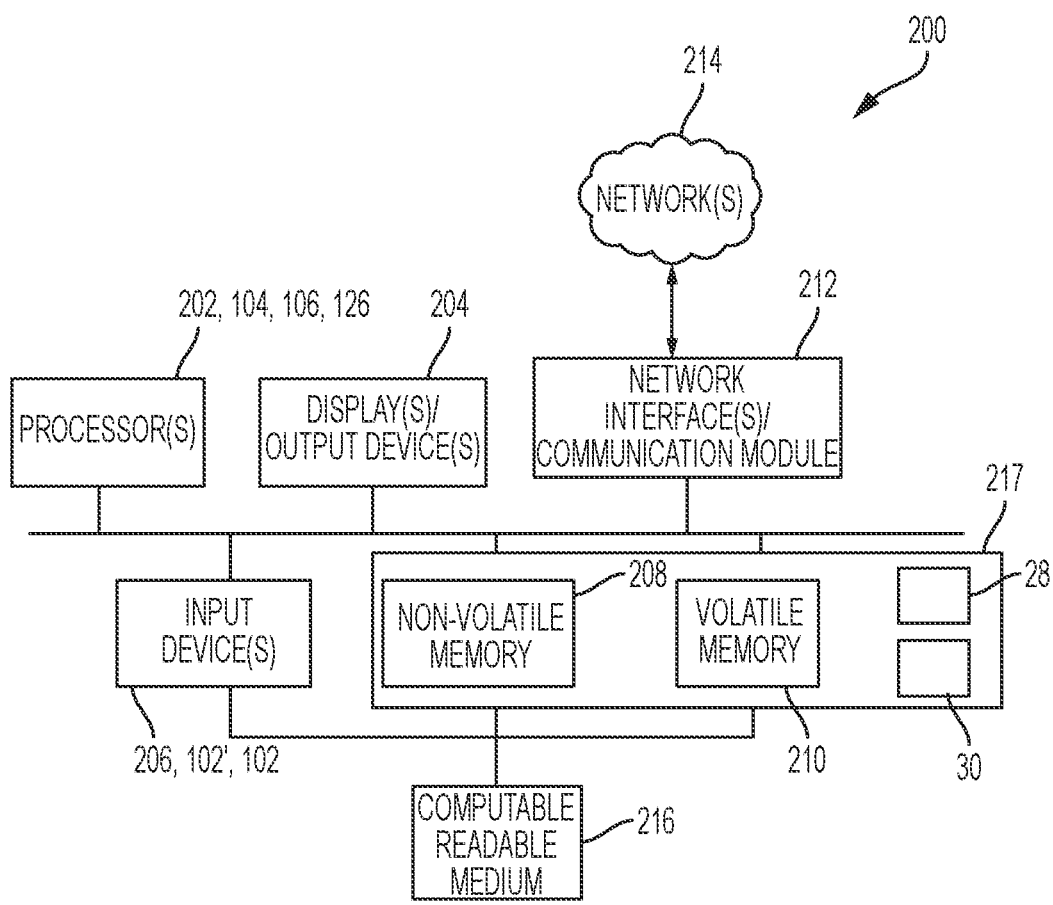
FIG. 2 depicts a schematic illustration of a system for implementing computer and software based methods to manage speed in a speed zone of FIGS. 1A-1B, according to one or more embodiments shown and described herein.

Referring to FIG. 2, the embodiments described herein can comprise a system 200 including one or more vehicular processors such as processors 202 such as the speed control processor 104 and vehicle control architecture that may be communicatively coupled to a memory 217. A network interface hardware 212 may facilitate communications over a network 214 via wires, a wide area network, a local area network, a personal area network, a cellular network, a satellite network, and the like. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The network interface hardware 212 can be communicatively coupled to any device capable of transmitting and/or receiving data via the network 214. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices.

The one or more processors 202 can execute machine readable instructions to implement any of the methods or functions described herein automatically. Memory 217 as at least one of non-volatile memory 208 or volatile memory 210 in a computer readable medium 216 for storing machine readable instructions can be communicatively coupled to the one or more processors 202. The one or more processors 202 can comprise a processor, an integrated circuit, a microchip, a computer, or any other computing device capable of executing machine readable instructions or that has been configured to execute functions in a manner analogous to machine readable instructions. The computer readable medium 216 can comprise RAM, ROM, a flash memory, a hard drive, or any non-transitory device capable of storing machine readable instructions.

Each of the one or more processors 202 and the memory 217 can be integral with the materials handling vehicle 100. Moreover, each of the one or more processors 202 and the memory 217 can be separated from the materials handling vehicle 100. For example, a management server, server, or a mobile computing device can comprise the one or more processors 202, the memory 217, or both. It is noted that the one or more processors 202 and the memory 217 may be discrete components communicatively coupled with one another without departing from the scope of the present disclosure. Accordingly, in some embodiments, components of the one or more processors 202 and components of the memory 217 can be physically separated from one another. The phrase "communicatively coupled," as used herein, means that components are capable of exchanging data signals with one another such as, for example, electrical signals via conductive medium, electromagnetic signals via air, optical signals via optical waveguides, or the like.

Thus, embodiments of the present disclosure may comprise logic or an algorithm written in any programming language of any generation (e.g., 1GL, 2GL, 3GL, 4GL, or 5GL). The logic or an algorithm can be written as machine language that may be directly executed by the processor, or assembly language, object-oriented programming (OOP), scripting languages, microcode, etc., that may be compiled or assembled into machine readable instructions and stored on a machine readable medium such as computer readable medium 216. Alternatively or additionally, the logic or algorithm may be written in a hardware description language (HDL). Further, the logic or algorithm can be implemented via either a field-programmable gate array (FPGA) configuration or an application-specific integrated circuit (ASIC), or their equivalents.

In embodiments, one or more warehouse maps 30 of the warehouse environment 150 (FIG. 1B) associated with a database 28 comprising one or more speed zone locations Z1-Z4 in the warehouse environment 150 may be stored in the memory 217. The system 200 can include one or more displays and/or output devices 204 such as monitors, speakers, headphones, projectors, wearable-displays, holographic displays, and/or printers, for example. Output devices 204 may be configured to output audio, visual, and/or tactile signals and may further include, for example, audio speakers, devices that emit energy (radio, microwave, infrared, visible light, ultraviolet, x-ray and gamma ray), electronic output devices (Wi-Fi, radar, laser, etc.), audio (of any frequency), etc.

The system 200 may further include one or more input devices 206 which can include, by way of example, any type of mouse, keyboard, disk/media drive, memory stick/thumb-drive, memory card, pen, touch-input device, biometric scanner, voice/auditory input device, motion-detector, camera, scale, and the like. Input devices 206 may further include cameras, such as digital and/or analog cameras, still cameras, video cameras, thermal imaging cameras, infrared cameras, cameras with a charge-couple display, night-vision cameras, three dimensional cameras, webcams, audio recorders, a laser scanner, a laser rangefinder, a 2D/3D mapping laser, a lidar, and the like. For example, an input device 206 may include the localization sensor 102' such as the camera 102 described herein.

As is noted above, the materials handling vehicle 100 can comprise or be communicatively coupled with the one or more processors 202. Accordingly, the one or more processors 202 can execute machine readable instructions to operate or replace the function of the operator controls. The machine readable instructions can be stored upon the memory 217. Accordingly, in some embodiments, the materials handling vehicle 100 can be navigated automatically by the one or more processors 202 executing the machine readable instructions. In some embodiments, the location of the materials handling vehicle 100 can be monitored by the localization system as the materials handling vehicle 100 is navigated.

For example, the materials handling vehicle 100 can automatically or manually navigate along the inventory transit surface 122 of the warehouse 110 along a desired path to a desired position based upon a localized position of the materials handling vehicle 100. In some embodiments, the materials handling vehicle 100 can determine the localized position of the materials handling vehicle 100 with respect to the warehouse 110. The determination of the localized position of the materials handling vehicle 100 can be performed by comparing data from the localization sensor 102' to map data. In an embodiment, the data from the localization sensor 102' as the camera 102 may be image data. The map data can be stored locally in the memory 217 as one or more warehouse maps 30, which can be updated periodically, or map data provided by a server or the like. In embodiments, an industrial facility map comprises a mapping of the one or more speed zones Z. Z1, Z2, Z3, and Z4 as stored in the database 28 as described herein. Specifically, the one or more processors 202 can execute machine readable instructions to perform localization system functions and operate or assist with operation of the materials handling vehicle 100.

In an embodiment, mapping of the one or more speed zones Z, Z1, Z2, Z3, and Z4 may occur through manual mapping utilizing a laser tool such as a laser range finder or laser distance meter or other suitable mapping scanning tools. In embodiments, utilized individual tags, such as RFID tags as described herein, may be mapped utilizing same or similar techniques while further using an antenna to identify a location of the individual tag.

Referring to FIG. 3, the system 200 is configured to implement a process 300. As a non-limiting example, the process 300 may be a control scheme to determine through the one or more processors 202 following machine-readable instructions, and through localization techniques as described herein, for example, a location of the materials handling vehicle 100 in the warehouse environment 150 to determine a current localized position of the materials handling vehicle 100 in the warehouse environment 150. The speed zone sensing subsystem 106 that is configured to provide an indication of whether the materials handling vehicle 100 is in a speed zone may use the current localized position in comparison to stored and/or sensed speed zone locations to make this determination.

Thus, in an aspect, the process 300 determines whether the materials handling vehicle 100 is in a speed zone Z based on the current localized position. As a non-limiting example, a navigation subsystem of the materials handling vehicle 100 may comprise one or more environmental sensors and an environmental database. In embodiments, the environmental sensors are configured to capture data indicative of a position of the materials handling vehicle 100 relative to the inventory transit surface 122 in the warehouse 110. Further, the environmental database may reside on or be remote from the materials handling vehicle 100 and may comprise stored data indicative of the one or more speed zones Z, Z1, Z2, Z3, and Z4, the inventory transit surface 122, or both. The navigation subsystem may be configured to enable at least partially automated navigation of the materials handling vehicle 100 along the inventory transit surface 122 utilizing the captured data and the stored data. For example, and not by way of limitation, it is contemplated that the navigation subsystem, the localization system, or both may utilize a stored warehouse map 30 and captured images of ceiling lights 114 or skylights 116 to enable navigation, localization, or both, as is disclosed in U.S. Pat. No. 9,174,830 issued on Nov. 3, 2015, (CRNZ 0053 PA), U.S. Pat. No. 9,340,399 issued on May 17, 2016, U.S. Pat. No. 9,349,181 issued on May 24, 2016, U.S. Pat. No. 9,958,873 issued May 1, 2018, and other similar patents and patent publications. It is further contemplated that the navigation subsystem, a localization subsystem, or both may utilize a stored warehouse map 30 and a tag layout 50 disposed on the inventory transit surface 122 as disclosed in U.S. Pat. No. 9,811,088 issued on Nov. 7, 2017 (CRO 0056 PA), and other similar patents and patent publications. Additional suitable environmental sensors include, but are not limited to, inertial sensors, lasers, antennae for reading RFID tags, buried wires, WiFi signals, or radio signals, global positioning system (GPS) sensors, global navigation satellite system (GNSS) sensors, ultra-wideband (UWB) sensors, or combinations thereof. By way of example and not as a limitation, UWB technology may be utilized for localization. UWB technology is a radio technology utilizing a low energy level for short-range, high-bandwidth communication over an ultra-wide radio spectrum portion, such as 3.1 to 10.6 GHz. UWB technology may include a transmitter on the materials handling vehicle 100 configured to transmit UWB transmissions for receipt by a receiver-anchor disposed in the warehouse environment 150. Such UWB transmissions generate radio energy at specific time intervals while occupying a large bandwidth at low energy levels and enable pulse-position or time modulation, and may modulate transmitted information on UWB pulse signals. An ability for the UWB technology to determine a time of flight of the transmission at different frequencies may assist with measuring distances at a high resolution and accuracy for localization. In an embodiment, such UWB technology may be utilized for localization as a backup to another current localization system to provide sufficient system redundancy and system self-checks in a manner that achieves a safety level required for automatic control of the materials handling vehicle 100.

In block 302, the vehicle operator is prompted to reduce a vehicle speed of the materials handling vehicle 100 to under a speed zone limit when the materials handling vehicle speed is approaching or in the speed zone Z. The materials handling vehicle 100 may be considered to be "in" the speed zone Z as described herein when the materials handling vehicle 100 is partially or fully in the speed zone Z. The materials handling vehicle 100 can be considered to be "approaching" a speed zone Z when the speed zone sensing subsystem 106 has detected the presence of the speed zone Z and the operating conditions of the materials handling vehicle 100 represent an operating condition where it is more likely than not that the materials handling vehicle 100 will actually enter the speed zone Z. Further, the speed control processor 104 may be configured to prompt the vehicle operator to reduce the vehicle speed of the materials handling vehicle 100 to under the speed zone limit when the vehicle speed is above the speed zone limit. The speed zone sensing subsystem 106 may include an operator alert component that is configured to alert the vehicle operator when the vehicle speed is above the speed zone limit, and the operator alert component may include a visual alert, an audible alert, or combinations thereof. By way of example, and not as a limitation, the visual alert may include a display on a display screen of the materials handling vehicle 100, and the audible alert may include an audible tone. When the vehicle speed is above the speed zone limit, the display for the visual alert may include a red display screen, a flashing display screen, a negative shape on the display, verbiage indicating speed overage, or combinations thereof. The negative shape on the display may include an X, N, minus sign, or exclamation point. The audible alert may include a negative audible tone, which may include a high decibel sound provided by a horn for a period of time corresponding to an overage period in which the vehicle speed is above the speed zone limit.

In embodiments, the process 300 alerts the vehicle operator that the materials handling vehicle 100 is in the speed zone Z. The speed zone sensing subsystem 106 may include an operator alert component that is configured to alert the vehicle operator that the materials handling vehicle 100 is in the speed zone Z. The operator alert component may include a visual alert, an audible alert, a speed zone display on a display screen of the materials handling vehicle, or combinations thereof. Additionally or alternatively, the operator alert component may be configured to alert the operator when the vehicle speed is above the speed zone limit. As a non-limiting example, the operator alert component may be configured to alert the operator when the vehicle speed is above the speed zone limit by an overage speed in a range of between about 0.4 mph and 1 mph, such as when the overage speed is approximately 0.5 mph.

As a non-limiting example, the operator may be prompted through display screen alerts and/or audible tone based alerts that the materials handling vehicle 100 is entering the speed zone Z. Further, an alert may indicate to the operator that the vehicle is over the speed limit. In an embodiment, an alert such as a red display screen of a display screen of the materials handling vehicle 100 and/or a negative tone may indicate to the operator that the vehicle is over the speed limit by a threshold which may be approximately 0.5 mph over the speed limit. Additionally or alternatively, the display screen may be flashing to indicate vehicle speeding in the speed zone Z, may use a different color, or may use a negative shape such as X or N or a minus sign or exclamation point. The negative tone may be a high decibel sound such as one provided by a horn, for instance, and may be provided for a period of time such as 10 seconds, during intervals, or over a duration of the speed overage period. The display screen may additionally or alternatively display verbiage indicating that the materials handling vehicle 100 is over the speed limit associated with the speed zone Z while in the speed zone Z. The process 300 further alerts and prompts the vehicle operator to reduce vehicle speed of the materials handling vehicle 100 to under a speed zone limit when the materials handling vehicle 100 is in the speed zone Z, Z1, Z2, Z3, and/or Z4. By way of example, and not as a limitation, each speed zone Z, Z1, Z2, Z3, and Z4 may include a respective speed zone limit different from the other speed zone limits. Further, each speed zone Z, Z1, Z2, Z3 may include other limits such as lift height restrictions and the like. In an embodiment, one or more performance settings of the materials handling vehicle 100 may be adjusted and/or restricted to limit speed of the materials handling vehicle 100, such as slowing of an acceleration profile and/or lifting profile of the materials handling vehicle 100, which may assist to increase safety of the materials handling vehicle 100 in a high traffic area, for instance. Similar restrictions may be imposed with respect to the speed zones Z, Z1, Z2, Z3, and/or Z4 as set forth in U.S. Pat. No. 9,811,088 issued on Nov. 7, 2017 (CRO 0056 PA), and other similar patents and patent publications.

The speed zone sensing subsystem 106 may include one or more truck-based sensors. A truck sensor of the one or more truck-based sensors may be configured to detect active or passive speed zone tags 60. A truck sensor of the one or more truck-based sensors may be configured for environmentally-based sensing of the speed zone Z. The one or more truck-based sensors may be configured to detect active or passive speed zone tags 60, for environmentally-based sensing of the speed zone Z, or combinations thereof. In embodiments, the speed zone sensing subsystem 106 may include truck-based localization hardware configured to utilize a warehouse map resident on the vehicle or an external warehouse map to sense the speed zone Z to then provide the indication of whether the materials handling vehicle 100 is in the speed zone Z.

In block 304, the process 300, through the speed control processor 104, determines whether the vehicle speed is under the speed zone limit in the speed zone Z. Upon a positive determination, the process may proceed to block 306.

In block 306, a vehicle speed cap is applied to limit a maximum vehicle speed of the materials handling vehicle to a magnitude that is at or below the speed zone limit when the speed control processor has determined that the vehicle speed is under the speed zone limit in the speed zone. In this manner, by waiting for the vehicle speed to drop below the speed zone limit in this speed zone Z, the speed control technology of the present disclosure allows the operator of the vehicle to actively or passively contribute to the speed cap application process. In many cases, this will provide for a more gradual and operator-friendly reduction in vehicle speed when the vehicle enters the speed zone Z. The process 300 may thus use the speed control processor 104 to apply a vehicle speed cap to the materials handling vehicle 100 at the speed zone limit within the speed zone based on a speed reduction by the operator in the speed zone Z. The alert to the vehicle operator that the materials handling vehicle 100 is in the speed zone Z may result in the operator reducing the speed of the materials handling vehicle 100, such as when the materials handling vehicle 100 is operating at or above the speed zone limit, such that the operator controls the reduction of the speed of the materials handling vehicle 100. Once the speed of the materials handling vehicle 100 is reduced to be operating within the speed zone limit, the vehicle speed cap is applied to the materials handling vehicle 100 in block 306. Through such selective application of a vehicle speed cap based on a speed reduction by the operator in the speed zone Z, the operator is able to maintain a speed at or under the speed limit and not risk one or more operator distractions that may result through, for example, watching the display screen of the vehicle while otherwise trying to maintain an uncapped speed in the speed zone Z. Such a selective application may thus encourage safe operator habits over an operator reliance of automated vehicle override of operator control with respect to vehicle speed when entering a speed zone as the operator may maintain control of the vehicle speed upon speed zone entry.

Other parameters than speed that may be maintained at a cap while in the speed zone may additionally or alternatively be, as non-limiting examples, lift acceleration, lift speed, and/or vehicle acceleration that may be limited or capped with respect to certain pre-defined areas of the warehouse environment 150 such as the warehouse 110. Thus, the speed control processor 104 may rather act as an operation control processor, and the speed zone sensing subsystem 106 may act as restricted zone sensing subsystem. The operation control processor may then be configured to prompt the vehicle operator to reduce an operation of the materials handling vehicle 100 to under an operation limit when the materials handling vehicle speed is approaching or in the restricted operation zone, determine whether the operation is under the operation limit in the restricted operation zone, and apply an operation cap to limit a maximum operation value of the materials handling vehicle 100 to a magnitude that is at or below the operation limit when the operation control processor has determined that the operation is under the operation limit in the restricted operation zone. As described above with respect to process 300, the restricted operation zone may be a speed zone Z, the operation may be a vehicle speed, the operation limit may be a speed zone limit, and the operation cap may be a vehicle speed cap. Additionally or alternatively, the operation may be a vehicle acceleration, a lift height, a lift speed, and/or a lift acceleration. The operation limit may then respectively be a vehicle acceleration limit, a lift height restriction, a lift speed limit, or a lift acceleration limit, and the operation cap may respectively be a vehicle acceleration cap, a lift height cap, a lift speed cap, or a lift acceleration cap.

In an embodiment, the operation control processor may be configured to override the operation cap applied to the materials handling vehicle 100 at the operation limit within the restricted operation zone based on an operator override action. The operator override action may include application of a throttle neutral action, application of a braking system, utilization of a dedicated override button, or combinations thereof.

In an aspect, the speed cap may be overridden by the operator. By way of example and not as a limitation, the operator may initiate an override operation through application of a throttle neutral action to release the speed cap. Alternatively, the override operation may include application of a braking system to brake the materials handling vehicle 100 and come to a complete stop or utilization of a dedicated override button to override the speed cap application. In an embodiment in which an erroneous prompt may be made outside of a speed zone Z and a speed cap applied, such as where a vehicle may become lost, the speed cap may be maintained until the vehicle position is recovered or the operator may override the speed cap through the override operation. In an aspect, the speed control processor 104 is configured to override the vehicle speed cap applied to the materials handling vehicle 100 based on the operator override action as described herein.

The speed zone sensing subsystem 106 may be configured to provide an indication of whether the materials handling vehicle 100 has exited or is approaching an exit of the speed zone Z. The speed control processor 104 may be configured to release the vehicle speed cap when the speed zone sensing subsystem 106 provides the indication that the vehicle has exited or is approaching an exit of the speed zone Z. The speed zone sensing subsystem 106 may include an operator alert component that is configured to alert the vehicle operator when the vehicle speed cap is released. The operator alert component may include a visual alert, an audible alert, or combinations thereof, as described herein.

In an embodiment, a positive green display screen and a positive tone may indicate to the operator that the operator is exiting the zone without a speed violation. The positive tone may be a light, low decibel based tone such as a bell ding. Additionally or alternatively, the display screen may use a different color, or may use a positive shape such as Y, a check mark, or a plus sign. Further, when the materials handling vehicle 100 exits the speed zone Z, the process 300 may automatically release the speed cap and provide the operator with at least one of a visual alert and audible indication that the speed cap is released and the materials handling vehicle 100 is exiting the speed zone Z. Thus, the operator will not need a throttle natural action to release the speed cap as this release may be automatically performed.

Such speed management applications with respect to the materials handling vehicle 100 and one or more speed zones Z, Z1, Z2 in a warehouse environment 150 as described herein provide a driver assistance function to prevent operator distraction while maintaining a speed limit in the speed zone Z, Z1, Z2. Further, use of a tag layout 50 associated with vehicle localization and/or speed zone mapping as described herein may occur such as through use of a row of RFID tags around a perimeter of a speed zone Z, Z1, Z2. The speed management applications as described herein are suitable for in-aisle, out-of-aisle, large area speed zone, and other warehouse environment area applications. Interaction logic provided by the process 300 and the embodiments described herein directed to alerting the operator of a materials handling vehicle 100 to slow down in a speed zone Z, Z1, Z2 without an automatic braking through a system of the materials handling vehicle 100, and subsequent application of a speed cap associated with the speed zone Z, Z1, Z2, when the operator reduces the speed of the materials handling vehicle 100 to be under the speed zone limit assists the operator in maintaining a safe and efficient speed in the speed zone Z, Z1, and Z2 without adding to and rather preventing against operator distraction during such speed maintenance.

For the purposes of describing and defining the present disclosure, it is noted that reference herein to a variable being a "function" of or "based on" a parameter or another variable is not intended to denote that the variable is exclusively a function of or "based on" the listed parameter or variable. Rather, reference herein to a variable that is a "function" of or "based on" a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

The invention claimed is:

1. A materials handling vehicle comprising a processor, a throttle, and a speed zone sensing subsystem coupled to the processor, wherein the speed zone sensing subsystem is configured to detect that the materials handling vehicle is in a speed zone and the processor is configured to execute operations comprising:
   applying a maximum vehicle speed limit of the materials handling vehicle to a magnitude that is at or below a speed zone limit when the speed zone sensing subsystem detects that the materials handling vehicle is in a speed zone; and
   overriding the maximum vehicle speed limit through application of a throttle neutral action by an operator of the materials handling vehicle, to release the maximum vehicle speed limit.

2. The materials handling vehicle of claim 1, wherein the processor is further configured to override the maximum vehicle speed limit by detecting, by the speed zone sensing subsystem, that the materials handling vehicle has exited the speed zone.

3. The materials handling vehicle of claim 1, wherein the processor is further configured to override the maximum vehicle speed limit by detecting, by the speed zone sensing subsystem, that the materials handling vehicle is approaching an exit of the speed zone.

4. The materials handling vehicle of claim 1, wherein the processor is further configured to generate an alert when a vehicle speed of the materials handling vehicle exceeds a speed zone limit by a threshold associated with the speed zone.

5. The materials handling vehicle of claim 1, wherein the processor is further configured to override the maximum vehicle speed limit based on application of a braking system, utilization of a dedicated override button, or combinations thereof.

6. The materials handling vehicle of claim 1, wherein the processor further is configured to execute operations comprising:
   applying a maximum vehicle acceleration limit of the materials handling vehicle to a magnitude that is at or below an acceleration limit of the speed zone; and
   overriding the maximum vehicle acceleration limit based on the application of the throttle neutral action.

7. The materials handling vehicle of claim 1, wherein the processor further is configured to execute operations comprising:
applying a maximum vehicle lift speed limit of the materials handling vehicle to a magnitude that is at or below a lift speed limit of the speed zone; and
overriding the maximum vehicle lift speed limit based on the application of the throttle neutral action.

8. The materials handling vehicle of claim 1, wherein the processor further is configured for:
applying a maximum vehicle lift acceleration restriction of the materials handling vehicle to a magnitude that is at or below a lift acceleration limit of the speed zone; and
overriding the maximum vehicle lift acceleration restriction based on the application of the throttle neutral action.

9. The materials handling vehicle of claim 1, wherein the processor further is configured for:
applying a maximum vehicle lift height restriction of the materials handling vehicle to a magnitude that is at or below a lift height limit of the speed zone; and
overriding the maximum vehicle lift height restriction based on the application of the throttle neutral action.

10. A materials handling vehicle comprising a processor, a throttle, and a zone sensing subsystem coupled to the processor, wherein the zone sensing subsystem is configured to detect that the materials handling vehicle is in a restricted operation zone and the processor is configured to execute operations comprising:
applying a maximum vehicle operational limit of the materials handling vehicle to a magnitude that is at or below an operational limit of the restricted operation zone; and
overriding the maximum vehicle operational limit through application of a throttle neutral action by an operator of the materials handling vehicle, to release the maximum vehicle operational limit.

11. The materials handling vehicle of claim 10, wherein the maximum vehicle operational limit of the materials handling vehicle comprises a maximum vehicle speed limit that is at or below a speed limit of the restricted operation zone.

12. The materials handling vehicle of claim 10, wherein the maximum vehicle operational limit of the materials handling vehicle comprises a maximum vehicle acceleration limit that is at or below an acceleration limit of the restricted operation zone.

13. The materials handling vehicle of claim 10, wherein the maximum vehicle operational limit of the materials handling vehicle comprises a maximum vehicle lift speed limit that is at or below a lift speed limit of the restricted operation zone.

14. The materials handling vehicle of claim 10, wherein the maximum vehicle operational limit of the materials handling vehicle comprises a maximum vehicle lift acceleration limit that is at or below a lift acceleration limit of the restricted operation zone.

15. The materials handling vehicle of claim 10, wherein the maximum vehicle operational limit of the materials handling vehicle comprises a maximum vehicle lift height limit that is at or below a lift height limit of the restricted operation zone.

16. The materials handling vehicle of claim 10, wherein the processor is further configured to override the maximum vehicle operational limit by detecting, by the zone sensing subsystem, that the materials handling vehicle has exited the restricted operation zone.

17. The materials handling vehicle of claim 10, wherein the processor is further configured to override the maximum vehicle operational limit by detecting, by the zone sensing subsystem, that the materials handling vehicle is approaching an exit of the restricted operation zone.

* * * * *

UNITED STATES PATENT AND TRADEMARK OFFICE
CERTIFICATE OF CORRECTION

PATENT NO. : 12,139,012 B2  
APPLICATION NO. : 18/493199  
DATED : November 12, 2024  
INVENTOR(S) : Kashyap Chandrasekar Page 1 of 1

It is certified that error appears in the above-identified patent and that said Letters Patent is hereby corrected as shown below:

In the Specification

In Column 10, Line(s) 44, after "zones", delete "Z." and insert --Z,--, therefor.

In the Claims

In Column 16, Line(s) 61, Claim 6, delete "further is" and insert --is further--, therefor.

In Column 17, Line(s) 2, Claim 7, delete "further is" and insert --is further--, therefor.

In Column 17, Line(s) 10, Claim 8, delete "further is" and insert --is further--, therefor.

In Column 17, Line(s) 19, Claim 9, delete "further is" and insert --is further--, therefor.

Signed and Sealed this  
Eighteenth Day of March, 2025

Coke Morgan Stewart  
*Acting Director of the United States Patent and Trademark Office*